United States Patent
Fransen et al.

(10) Patent No.: US 10,542,725 B2
(45) Date of Patent: Jan. 28, 2020

(54) DEVICE FOR THE MAINTENANCE OF FLOOR COVER MATERIAL PRESENT ON AN ANIMAL-SHED FLOOR

(71) Applicant: LELY PATENT N.V., Maassluis (NL)

(72) Inventors: Renatus Ignatius Josephus Fransen, Vlaardingen (NL); Frank Gerard Regelink, Delft (NL); Karel Van Den Berg, Bleskensgraaf (NL)

(73) Assignee: LELY PATENT N.V., Maassluis (NL)

( * ) Notice: Subject to any disclaimer, the term of this patent is extended or adjusted under 35 U.S.C. 154(b) by 368 days.

(21) Appl. No.: 15/501,026

(22) PCT Filed: Aug. 18, 2015

(86) PCT No.: PCT/NL2015/050581
§ 371 (c)(1),
(2) Date: Feb. 1, 2017

(87) PCT Pub. No.: WO2016/036240
PCT Pub. Date: Mar. 10, 2016

(65) Prior Publication Data
US 2017/0215371 A1    Aug. 3, 2017

(30) Foreign Application Priority Data

Sep. 2, 2014  (NL) .................................... 2013400

(51) Int. Cl.
*A01K 1/01* (2006.01)
*A01K 1/015* (2006.01)
(Continued)

(52) U.S. Cl.
CPC .......... *A01K 1/0103* (2013.01); *A01K 1/0155* (2013.01); *B30B 9/20* (2013.01); *G05D 1/0219* (2013.01); *Y10S 901/01* (2013.01)

(58) Field of Classification Search
CPC ........ A01K 1/01; A01K 1/015; A01K 1/0103; A01K 1/0128
(Continued)

(56) References Cited

U.S. PATENT DOCUMENTS 3,353,947 A * 11/1967 Kramer ................... A01C 3/00
                                                    100/74
6,099,660 A *  8/2000 Davis ..................... B08B 3/022
                                                    134/126
(Continued)

FOREIGN PATENT DOCUMENTS

DE      1457883 A1 *  5/1969  ............. A01C 3/04
DE    103 20 943 A1    12/2004
(Continued)

OTHER PUBLICATIONS

International Search Report dated Jan. 7, 2016, in PCT/NL2015/050581 filed Aug. 18, 2015.
(Continued)

*Primary Examiner* — Christopher M Koehler
*Assistant Examiner* — Jared O Brown
(74) *Attorney, Agent, or Firm* — Oblon, McClelland, Maier & Neustadt, L.L.P.

(57) ABSTRACT

A device for maintenance of floor cover material present on an animal-shed floor in an animal shed, and including: a pick-up mechanism, a press, a moisture collector, and a moisture supply mechanism. The pick-up mechanism is configured to pick up floor cover material from the animal-shed floor and supply it to the press, the press is configured to press the supplied floor cover material and to supply moisture which has been squeezed out to the moisture collector and to convey pressed floor cover material to the
(Continued)

animal-shed floor. The moisture supply mechanism is configured to supply moisture to the floor cover material which has been picked up.

18 Claims, 2 Drawing Sheets

(51) Int. Cl.
*B30B 9/20* (2006.01)
*G05D 1/02* (2006.01)

(58) Field of Classification Search
USPC .............. 119/442, 447, 451, 479, 525–530
See application file for complete search history.

(56) References Cited

U.S. PATENT DOCUMENTS

| | | | | |
|---|---|---|---|---|
| 7,341,024 B2* | 3/2008 | Wood | ............... | A01K 1/01 119/416 |
| 2003/0204931 A1* | 11/2003 | Kim | ............... | E01H 1/0845 15/340.3 |
| 2010/0076641 A1* | 3/2010 | Van Den Berg | ......... | A01K 1/01 701/26 |
| 2013/0098306 A1* | 4/2013 | Loosveld | ............... | A01K 1/00 119/448 |
| 2013/0298842 A1* | 11/2013 | Underwood | ........... | A01K 31/04 119/442 |
| 2015/0223429 A1 | 8/2015 | Van Adrichem et al. | | |

FOREIGN PATENT DOCUMENTS

| | | | | |
|---|---|---|---|---|
| DE | 10320943 A1 * | 12/2004 | ............... | A01K 1/01 |
| DE | 20 2005 010 939 U1 | 10/2005 | | |
| DE | 102014113909 A1 * | 3/2016 | ........... | A01K 1/0128 |
| EP | 2169501 B1 | 3/2010 | | |
| EP | 2 243 354 A1 | 10/2010 | | |
| FR | 3024939 A1 * | 2/2016 | ............... | A01K 1/01 |
| NL | 1038566 C * | 8/2012 | ............... | A01K 1/01 |
| WO | WO-2010080029 A1 * | 7/2010 | ........... | A01K 1/0082 |
| WO | WO 2014/051421 A2 | 4/2014 | | |

OTHER PUBLICATIONS

International Search Report issued Jan. 7, 2016, in PCT/NL2015/050581 dated Aug. 18, 2015.

* cited by examiner

DEVICE FOR THE MAINTENANCE OF FLOOR COVER MATERIAL PRESENT ON AN ANIMAL-SHED FLOOR

The invention generally relates to a device for the maintenance of floor cover material present on an animal-shed floor.

Known floor cover materials include sawdust, wood shavings, chopped straw, flax bedding material and manure fibers such as pressed manure or so-called thick fraction. In that case, the floor cover in an animal shed is formed by distributing and spreading the selected floor cover material to form a ground-covering layer on an animal-shed floor. The floor cover material serves as a substrate for the animals to lie on, to stand on, to walk on and the like, and serves to collect excreta from the animals, such as feces and urine. In some animal sheds, the ground of the entire living environment of the animals is covered with a floor cover material. In livestock farming, such housing for animals is known as a free-range animal shed.

As the excreta from the animals falls onto the floor coverfloor cover material, said material becomes soiled and must be maintained.

The invention therefore relates in particular to a device for the maintenance of floor cover material present on an animal-shed floor, the device comprising:
pick-up means,
a press and
a moisture collector,
wherein the pick-up means are configured to pick up floor cover material from the animal-shed floor and supply it to the press, wherein the press is configured to press the supplied floor cover material and to supply moisture which has been squeezed out to the moisture collector and wherein the press is also configured to convey pressed floor cover material to the animal-shed floor.

An example of a device for the maintenance of floor cover material present on an animal-shed floor is described in DE10320943 A1, said known device comprising pick-up means, a press and a moisture collector, and means for separating the manure from the floor cover material, in particular from sawdust, and also supplying wet floor cover material to the press and subjecting it to a pressing action. In practice, the device proposed in this document does not appear to be sufficient to maintain a floor cover for dairy cows. It is an object of the invention to provide an alternative device for the maintenance of floor cover in an animal shed, which device is suitable for the maintenance of floor cover in an animal shed in which dairy cows are housed. It is also an object of the invention to provide a device which can create a pleasant living environment for the animals in the animal shed in an economically feasible manner.

The object in question is achieved by providing a device for the maintenance of floor cover with floor cover material in an animal shed as claimed in claim 1, in particular a device comprising pick-up means, a press and a moisture collector, wherein the pick-up means are configured to pick up floor cover material from the animal-shed floor and supply it to the press, wherein the press is configured to press the supplied floor cover material and to supply moisture which has been squeezed out to the moisture collector and to convey pressed floor cover material to the animal-shed floor,
and which device is provided with moisture supply means which are configured to supply moisture to the floor cover material, in particular to the floor cover material which has been picked up.

Research in the context of the invention has revealed that maintenance of a floor cover material of an animal shed which merely prevents the material from becoming too wet is not sufficient, since floor cover material may also become too dry. Floor cover which is too dry leads to a dusty living environment in the animal shed. The dust not only creates an unpleasant atmosphere in the animal shed, but also causes pollution and thus possibly malfunctions of machines present in the animal shed, such as milking machines or milking robots at dairy farms, for example. Moreover, the research also revealed that the speed at which the floor cover material can absorb moisture such as urine decreases as it becomes drier. As a result, the moisture remains on top of the material for longer, leading to the creation of local wet spots and animals which lie down becoming wet. This can lead to skin problems and, in dairy animals, to udder problems such as mastitis, or to claw problems and the like.

The invention has solved these problems by providing the device with moisture supply means. This overcomes the problem of floor cover material becoming too dry, because moisture is supplied to the floor cover material. As a result, the atmosphere will not become dusty and the speed at which the floor cover material absorbs moisture will not decrease.

In embodiments, the device is equipped with control means which are configured to control the moisture supply means.

The supply of moisture to floor cover material is controllable with the aid of the control means. It is thus possible to choose whether or not to supply moisture, and it is also possible, for example, to work according to a schedule, which has the advantage of saving energy and moisture.

In embodiments, the device comprises measuring means which are configured to determine a dry matter content of the floor cover material, wherein the control means are configured to control the moisture supply means as a function of the determined dry matter content.

With the aid of the measuring means and the control means, the device can automatically control the moisture supply means on the basis of the determined dry matter content. The device is thus able to operate efficiently. With such a device, it is possible to actuate the moisture supply means in different ways for different dry matter contents. As a result, the device is able to supply moisture only when desired. This advantageously makes the device more efficient.

In embodiments, the moisture supply means are actuated in order to supply moisture if the determined dry matter content is higher than 45%, in particular higher than 50%.

Moisture is thus only supplied to floor cover material which is too dry. Research in the context of the invention has shown that the speed of moisture absorption by floor cover material with a dry matter content higher than 50%, in particular higher than 45%, decreases to such an extent that the moisture remains on the floor cover for an unacceptably long time. Undesired dust also arises.

In embodiments, the moisture supply means comprise a moisture reservoir having a moisture outlet which is operable by the control means and having an inlet.

The moisture outlet may be arranged in a favorable position in the device without it having to be in the direct vicinity of the reservoir. By configuring the outlet to be movable or by providing a plurality of moisture outlets, it is possible to controllably select where moisture is supplied to floor cover material.

In embodiments, the moisture reservoir is fed by the moisture collector. The fact that the moisture reservoir is fed by the moisture collector means that moisture which is squeezed out can be reused. As a result, the device operates in an efficient manner. It is also possible to configure the moisture collector as a moisture reservoir.

In embodiments, the moisture outlet is configured to supply moisture from the moisture reservoir to floor cover material which has been picked up by the device. By configuring the moisture outlet to supply moisture to floor cover material which has been picked up by the device, the supply of moisture is more readily controllable than when moisture is supplied, for example, to floor cover material which has not yet been picked up or to material which is supplied to the animal-shed floor.

In embodiments, the moisture outlet is configured to add moisture from the moisture reservoir to floor cover material which has been picked up by the pick-up means or to floor cover material which has been supplied to the press.

By arranging the moisture outlet, for example, at the press inlet, or even in the press, moisture can be supplied to material which is supplied to the press. This facilitates the transit of the material through the press. Moreover, with such a device it is possible to control the dry matter content in the pressed material in a relatively simple manner, by wetting the floor cover material and then pressing it at a certain set pressing pressure. By arranging the moisture outlet, or a second moisture inlet, in the pick-up means, it is possible to rapidly counteract the 'dusting' of dry material by supplying moisture.

In embodiments, the device comprises a storage space for additives having an additive outlet which is operable by the control means and configured to supply additives to the floor cover material. In embodiments, the additive outlet is configured to supply additives to the moisture reservoir.

By providing the device with an additive storage space and an additive outlet, it is possible to add additives to the floor cover material, optionally together with the moisture. As a result, the maintenance of the floor cover may be improved, for example by the addition of preservatives which prevent the growth of bacteria, resulting in a decrease in the bacterial production of the enzyme urease and thus a reduction in the formation of ammonia from urine, or, for example, of other urease-inhibiting preparations.

In embodiments, the device comprises a guide which is operable by control means and movable between a first position, wherein floor cover material which has been picked up is supplied to the press, and a second position, wherein floor cover material which has been picked up is conveyed to the animal-shed floor bypassing the press and wherein the control means are configured to control the guide as a function of the determined dry matter content.

By means of the operable guide, the device is now capable of conveying floor cover material through the device via the press or bypassing the press. For example, it is possible to choose to convey material to which no moisture has been supplied through the device bypassing the press. This results in a lower energy consumption of the machine and reduced wear on the press.

In embodiments, the control means are configured in such a way that the guide is moved into the second position if the determined dry matter content is higher than 20%, in particular higher than 25%.

With a device according to this embodiment, floor cover material having a dry matter content of higher than 20 percent, in particular higher than 25%, is conveyed to the floor bypassing the press. Research related to the invention has revealed that floor cover material with a dry matter content of higher than 20%, and in particular higher than 25%, is not too wet for a healthy animal shed atmosphere. Material of this kind which has been picked up does not have to be pressed and in such cases can thus be conveyed to the animal-shed floor bypassing the press, which saves energy.

In embodiments, the guide is moved into the second position if the determined dry matter content is also lower than 50%, in particular lower than 45%. With a device according to this embodiment, floor cover material with a dry matter content higher than 20 percent, in particular higher than 25% and also with a dry matter content lower than 50%, in particular lower than 45%, is conveyed to the floor bypassing the press. Research related to the invention has revealed that floor cover material with a dry matter content of higher than 20%, and in particular higher than 25%, is not too wet for a healthy animal shed atmosphere and that floor cover material with a dry matter content of lower than 50%, in particular lower than 45%, is not too dry. Material of this kind which has been picked up does not have to be pressed and also does not have to be supplied with any moisture. In such cases, it can therefore be conveyed to the animal-shed floor bypassing the press, which saves energy.

An animal in an animal shed will urinate and defecate sequentially and, after having urinated or defecated, will walk away. The feces and urine are therefore at different places on the floor cover material. In some places, urine will be passed on the floor cover material, as a result of which the material is wet. In other places, feces are deposited, as a result of which the floor cover material has not become particularly wet, but has been enriched with fiber-rich material. Urine does not contain any fiber whereas feces do. When the floor cover material is picked-up from such a urine spot and pressed, the moisture which is squeezed out will have a different composition from the moisture which is squeezed out from picked-up floor cover material which contains feces. The moisture squeezed out from a urine spot will contain few fibers, whereas the moisture squeezed out from a feces spot may contain fibers. Moisture squeezed out from a feces spot may even contain sediment due to small fibers and other materials which have found their way into the squeezed-out moisture. In a roller press, for example, small particles may be pressed through the holes in a perforated roller and reach the moisture collector via the sides of the roller. When all of the squeezed-out moisture, from both urine spots and feces spots, is supplied to the moisture collector, the amount of sediment can negatively influence the fluidity of the material in this tank.

In embodiments, the device is thus advantageously provided with a material collecting tank and a measuring means for measuring a parameter of the moisture which has been squeezed out, and wherein the moisture which has been squeezed out is guided from the press to the moisture collecting tank or to the material collecting tank as a function of the measured parameter. As a result, the device can provide three material streams: a first stream of solid material, a second stream of moisture which has been squeezed out, and a third stream as an intermediate fraction.

In embodiments, the measuring means is configured to measure the viscosity of the moisture which has been squeezed out and the parameter is a viscosity parameter. By measuring the viscosity of the moisture which has been squeezed out, it is possible to distinguish the squeezed-out moisture from a urine spot from the squeezed-out moisture from a feces spot. On the basis of the result of the viscosity measurement, it is then possible to direct a guide partition from a first position in which the moisture which has been squeezed out is guided to the moisture collector and a second position in which the moisture which has been squeezed out is guided to the material collecting tank.

In embodiments, the device comprises a buffer tank and the device is configured to convey floor cover material which has been picked up to the animal-shed floor via the buffer tank.

With the aid of a buffer tank, the device can convey material which has been picked up to the animal-shed floor in a controlled manner, which has a leveling effect on the layer of floor cover material. In the case of devices from embodiments having a guide which is controllable by operating means, material which has been picked up can be conveyed to the animal-shed floor bypassing the press.

In embodiments, the buffer tank comprises a moisture outlet for adding moisture from the moisture reservoir to floor cover material which has been supplied to the buffer tank.

In this embodiment, moisture can be supplied to cover material in the buffer tank. In the case of devices having a controllable guide, it is advantageously possible to supply the material to which moisture must be supplied to the buffer tank bypassing the press, instead of via the press. In such a device, the press is used as little as possible, which saves a lot of energy.

In embodiments, the device comprises a vehicle, and in particular an autonomous vehicle. With a device which comprises a vehicle, the device can be driven or pulled through the animal shed and floor cover material present on the animal-shed floor can then be maintained in this way. With a device which comprises an autonomous vehicle, the device can maintain the animal-shed floor and floor cover material present on the animal-shed floor in an autonomous way.

The invention will be explained below with reference to the drawing, which shows a non-limiting exemplary embodiment of the invention, in which identical reference numerals indicate identical or similar components, and in which.

Figure 1:
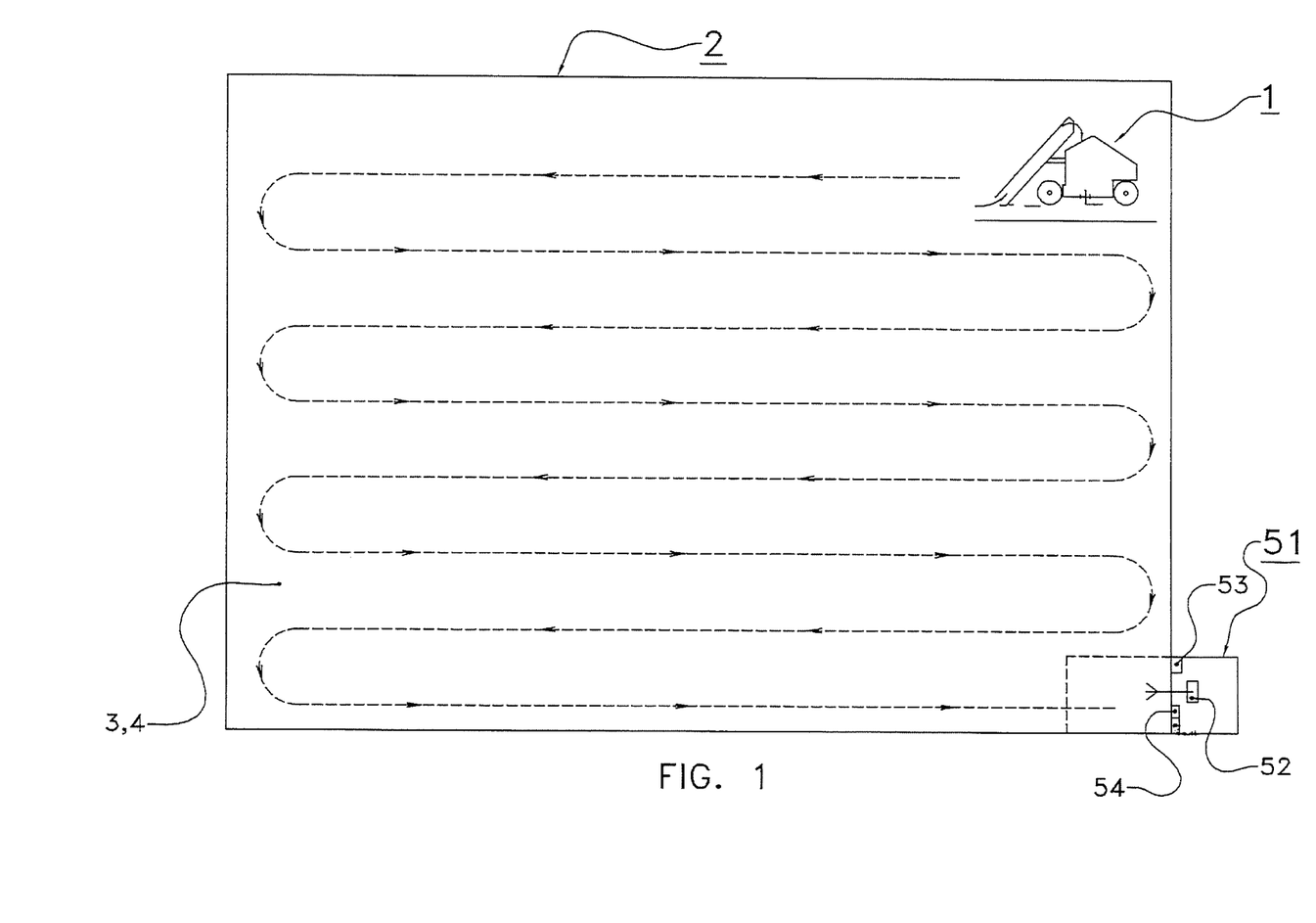
FIG. 1 diagrammatically shows a top view of an animal shed with a device for the animal-shed floor present floor cover material according to the invention.
Figure 2:
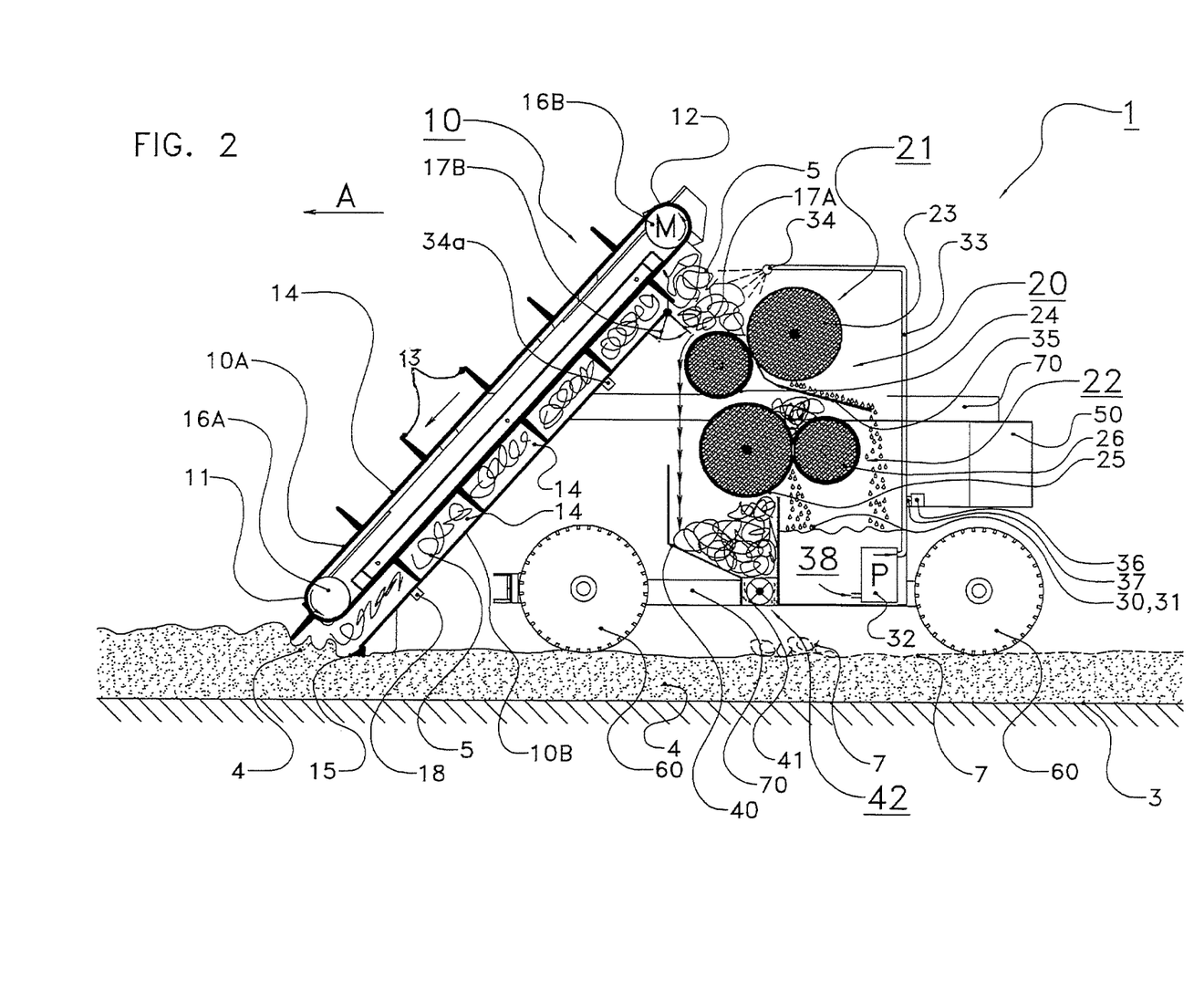
FIG. 2 shows a diagrammatic side view of an embodiment of the device according to the invention, which is configured to be used in an animal shed for picking up, treating and replacing floor cover material.

FIGS. 1 and 2 show an embodiment of the device in the form of a vehicle 1 according to the invention, which is configured to be used in an animal shed 2 for picking up, treating and replacing floor cover material 4 which is present on an animal-shed floor 3. Apart from the embodiment shown, other embodiments are conceivable. The description below should therefore be interpreted as being non-limiting and purely illustrative for the invention. Terms such as "above" and "below" should be understood on the basis of normal orientation, and are used in this text solely for the sake of clarity.

The vehicle 1 comprises pick-up means in the form of a conveyor belt assembly 10, a press in the form of a roller press 20, a moisture collector in the form of moisture collecting tank 30, a buffer tank 40, control means 50, wheels 60, and a frame 70 which is provided in order to support and retain at least these parts 10, 20, 30, 40, 50 and 60. The orientation of the vehicle 1 as illustrated in FIG. 2 is a normal orientation of the vehicle 1, in other words an orientation in which the vehicle 1 can be used in order to perform its functions. In this orientation, the wheels 60 rest on the floor cover material 4 which is present on the animal-shed floor 3, the roller press 20 is at a level directly above the moisture collecting tank 30 and the buffer tank 40. The illustrated embodiment has three wheels, a steerable front wheel 60 is steerable, and two rear wheels 60. When viewed in the direction of travel (indicated by arrow A) of the vehicle 1, the steered front wheel 60 is situated behind the conveyor belt 10, so that an area in front of the conveyor belt 10 is completely free and the conveyor belt 10 can pick up floor cover without being hindered.

The conveyor belt assembly comprises an endless conveyor belt 10a and a cover 10b, and the assembly extends obliquely upwards, with a top end 12 of the conveyor belt 10a emerging above the roller press 20. The conveyor belt comprises a lower reversing roller 16a and an upper reversing roller 16b, and is provided with a drive motor M at the upper reversing roller 16b, by means of which the endless belt is drivable in a circular fashion. The belt is provided with partitions 13 which protrude outwards. The partitions 13 divide the belt into compartments 14. The cover 10b of the conveyor belt assembly is more or less equal in height and width to the dimensions of the conveyor belt and is arranged on the rear side of the conveyor belt 10a, parallel to the conveyor belt, and thus encloses the conveyor belt on the rear side. The distance at which the cover 10b is positioned parallel with respect to the conveyor belt 10a is approximately equal to the length of the protruding partitions 13. As a result, the cover 10b forms, together with the conveyor belt 10a and the partitions 13, enclosed compartments 14 on the rear side of the conveyor belt. Not visible in these figures is the fact that the cover is also provided with side walls, as a result of which the compartments are also entirely closed and the material which has been picked up cannot fall out of the vehicle via the sides of the conveyor belt. The cover 10b thus has the form of a U-shaped duct. The distance between the belt and the cover and the dimension of the partitions 13 are chosen in such a way that, in the driven state, the movement of the endless belt having partitions is not hindered by the duct-shaped cover 10b. During operation of the belt, the partitions 13 push floor cover material which has been picked up upward and prevent material which has been picked up from sliding downward during its movement upward. The cover 10b is provided with a pick-up end 15 at the bottom end which is lower than the bottom end 11 of the conveyor belt. As a result, a pick-up opening for picking up floor cover material is formed between the pick-up end 15 of cover 10b and the conveyor belt 10a, and in particular between lower reversing roller 16a at the bottom part of the conveyor belt and pick-up end 15. When the conveyor belt circulates during operation, each partition 13 temporarily closes off this opening as it passes the stationary pick-up end 15.

The cover 10b ends near and some distance below the top end 12 of the conveyor belt, which creates a space through which the floor cover material which has been picked up can be deposited. This deposit opening is located above the press 20. A movable material guide 17 is arranged here in the form of a hingeable flap. In a first position 17a of the flap 17, said flap 17 supplies the material which has been picked up to the press. In a second position 17b, the flap is folded downward and the material which has been picked up falls down from the conveyor belt in front of the press 20 into the buffer tank 40. The flap comprises an operating element which, when actuated by the control means 50, sets the flap 17 in the first or the second position. Two paths through the machine are thus possible and settable, a so-called pressing path with the flap in the first position and a so-called transit path with the flap in the second position.

The press 20 in the embodiment of the vehicle 1 illustrated in FIG. 2 comprises roller press 20 two sets of rollers 21, 22, namely an upper set of rollers 21 and a lower set of rollers 22, in order to press the material supplied to the press in two pressing actions and therefore remove moisture. The upper set of rollers comprises a perforated, hollow roller 23 and a closed, pressure-exerting roller 24, and the lower set of rollers comprises a closed roller 25 and a pressure-exerting roller 26. As is usual and known in roller presses in general, the pressure-exerting roller is configured to provide a settable pressing pressure by means of the force with which the rollers are pressed against one another. This force, and thus the pressing pressure, can be settable by means of a compression arm or another member which presses the pressure-exerting roller against its partner roller. The rollers of the press are rotatable and are driven, for example, by means of a central motor having suitable transmissions and couplings. This is not shown in greater detail in the figures. Instead of a press motor, a motor may be provided for each press roller set a motor for each set of rollers or even for each roller. The pressure-exerting rollers are provided with a coating, such as rubber, which is somewhat compressible. Scrapers (not illustrated) are also provided, which scrapers scrape the pressed material off of the rollers and guide it to the next set of rollers or to the buffer tank 40, respectively. When the machine is in use, floor cover material 5 which is picked up falls from the conveyor belt 10a near the top end 12, in particular from the deposit opening, onto the upper set of rollers 21 via the guide 17 which is in the first position. The upper set of rollers 21 performs a first pressing action, which may release moisture. This moisture is pushed by means of pressing pressure into the inside of the perforated roller via the perforations and flows back out and partially to the side of this roller through the perforations, via moisture guide plate 35, and is collected in the moisture collector 30. The pressed material which emerges from the upper set of rollers 21 continues toward the lower set of rollers 22 and is subjected to a second pressing action there, which may once again release moisture. This moisture initially collects in the v-shaped duct at the top between the two rollers of the second set of rollers and runs off at the side toward the moisture collecting tank 30 where it is collected. The pressed material which emerges from the lower set of rollers 22 is collected in the buffer tank 40. From the buffer tank 40, the buffered material is supplied evenly to the animal-shed floor 3 via a metering opening 41 and metering roller 42. This creates a layer of replaced floor cover material 7 behind the vehicle.

Furthermore, the vehicle 1 comprises moisture supply means having a pump 32, pipe 33 and moisture outlet 34. The pump 32 is arranged at (or in) moisture reservoir 30, 31 and can transport moisture from the moisture reservoir to the moisture outlet 34 via the pipe 33. The moisture outlet is located above the roller press 20. An alternative location for the moisture outlet is indicated by reference numeral 34a, near the top end of the conveyor belt on the protective case 10b of the conveyor belt 10. The control means 50 control the supply of moisture and, in the event that there are a plurality of moisture outlets, also the location where moisture is supplied, by actuating the pump and/or valves and/or closure elements suitable for this purpose.

The vehicle also comprises an additive store 36 having an operable additive outlet 37 which is operated by the control means 50 and is configured to add additives to the moisture reservoir. In this embodiment, the operable additive outlet 37 may be a metering pump which meters the additives in a liquid state from the additive store to the moisture reservoir. It is therefore possible to also supply additives via the moisture which is supplied to the floor cover material. In this case, possible additives include, for example, urease inhibitors in order to inhibit the emission of ammonia in the animal shed.

Furthermore, the illustrated vehicle comprises measuring means 18 for measuring the dry matter content of the floor cover material, or for measuring properties related to the dry matter content from which it is possible to determine the dry matter content or an indication therefor. An example of a measurable property related to the dry matter content is the moisture content, which can be determined using, for example, microwave moisture meters, near-infrared meters (NIR, NIRS, etc.), induction meters and the like.

The self-propelled vehicle 1 is displaceable in a working area, in use the vehicle moves over the floor cover material which is present on the animal-shed floor 3. The vehicle is provided with a drive and steering system for driving and steering the vehicle and means present on the vehicle, this being controlled by means of control means 50. The (steering) wheels 60 are driven by means of electric drive motors, as are the press, the pump and the conveyor belt. The sensor 18 also operates on electricity. The drive and steering system comprises a battery system (not illustrated) for storing electrical energy. The battery system is connected to the electric motors. FIG. 1 illustrates a charging station 51 which is provided with means 52 for charging the battery system. The means comprise a coupling element 52 by means of which the vehicle can be coupled to the charging station using a vehicle coupling element (not illustrated) in order to charge the battery system. The charging station is also provided with means 54 for supplying/removing additives, means for supplying/removing floor cover material for the buffer 40, and optionally with means 53 for supplying/removing moisture for the moisture reservoir 31.

The vehicle comprises suitable navigation means (not illustrated) in order to be able to autonomously travel a route in the working area. FIG. 1 illustrates a winding route which can be traveled by the vehicle in order to treat the entire floor surface. Other routes are also possible. The routes may be set in advance or may be generated by the control means on the basis of a map. Alternatively, the vehicle may be configured to generate a map itself and to travel routes itself using so-called SLAM (simultaneous localization and mapping) means. As the vehicle moves in an area in which animals are housed, the vehicle is also provided with means, such as for example a camera, which are configured to detect obstacles such as animals (not illustrated) and control means in order to react with an appropriate action to a detected obstacle and/or animal. Common actions are slowing down, stopping and/or evasion. The vehicle may also deal with animals detected as obstacles in accordance with the method patented by the applicant in EP2169501B1, which means that the control means determine together with the navigation means whether the detected animal is in the path of the vehicle, and if so, whether it is standing. If the animal is standing the vehicle does not adapt the route because the animal can walk away. The vehicle is provided with a warning device which emits an audible warning signal as it moves.

During operation of the vehicle 1, the vehicle moves forward in the direction of arrow A illustrated in FIG. 2. Due to the forward movement of the vehicle, the cover 10b and in particular the pick-up foot 15 pushes a part of the floor cover material which is present in a layer on the animal-shed floor forward and slightly upward. At the same time, the conveyor belt 10b rotates in a counterclockwise direction, as a result of which each partition 13 on the underside 11 of the conveyor belt 10a moves counter to the direction of travel of the vehicle. The combined movement of the partition 13 together with the forward movement of pick-up foot 15 pushes an amount of ground material through the pick-up opening into a compartment 14. As the belt continues to rotate, the partition 13 which pushed the amount of material through the pick-up opening closes off the compartment 14 and moves the material upward in the direction of the top end 12. The material which is picked up in this way moves through the measuring area of sensor 18. As a result, the dry matter content of the material which has been picked up is determined.

Depending on the determined dry matter content, the control means actuate the moisture supply means to optionally supply moisture to the material which has been picked up. In the embodiment shown in FIG. 2, moisture is supplied to the floor cover material which has been picked up by means of outlet 34 at the press inlet of press 20. In this case, the movable flap 17a is in the first position so that the floor cover material which has been picked up is supplied to the press 20. The upper set of rollers 21 performs a first pressing action, in which moisture is released from the slurry and collected in the collecting tank 30. The pressed material which emerges from the upper set of rollers 21 continues to the lower set of rollers 22 and is subjected to a second pressing action there, in which moisture is once again released and collected in the collecting tank 30. The pressed material which emerges from the lower set of rollers 22 is collected in the buffer tank 40 and supplied to the animal-shed floor by means of buffer tank outlet 41 and metering roller 42.

The floor cover material may consist entirely of a solid fraction of manure (dried manure or manure fibers). In that case, the vehicle removes unnecessary moisture from the floor cover and the manure from the animals simultaneously provides new fibers. However, it is also possible, for example, that the animal shed was put into use with a floor cover of sawdust or another suitable material which then becomes a mixture of sawdust and dry manure fibers over time, with the proportion of manure fibers increasing ever further. The dry manure fibers form a bedding material which is pleasant for animals to walk around and lie down in. Moreover, the manure fibers have an excellent moisture-absorbing effect, meaning that the manure fibers are readily capable of retaining feces and urine from the animals.

In the embodiment shown, the moisture supply means are preferably actuated in order to supply moisture if the dry matter content is higher than 45%, in particular higher than 50%. Moisture supply is regulated by operating the pump and/or valves. As the dry matter content is determined at the start of the conveyor belt, it is possible to calculate, given a known transport speed of the belt, when the amount of material which has been picked up in this compartment 14 will reach the top and be supplied to the press. The actuation of the moisture outlet 34 and/or pump 32 and/or closure elements can thus be controlled in terms of time in order to supply moisture. In the same way, moisture can be supplied to the compartment when a moisture outlet is available at position 34a. Moisture may be freely supplied to the material given that the material is subjected to a pressing treatment after the moisture has been supplied. The press 20 is set in such a way that the dry matter content following the two pressing actions is in a range from 30% to 35%. The pressure-exerting rollers 24, 26 are pressed with a certain pressure against the perforated roller 23 and the closed roller 25, respectively. This pressure ultimately determines the pressing pressure and thus also how much moisture can be squeezed out of the material and thus also the range of the dry matter content of the pressed material. It is common for a compression arm or compression spring to be used in the suspension of the sets of rollers, in order to press the pressure-exerting rollers against the partner roller. The pressure of the compression arm and/or the spring load are settable, and the pressing pressure can thus be set. The pressure at which the desired dry matter content is reached can then be determined by means of simple tests.

Depending on the measured dry matter content, the movable flap 17a is also actuated in order to guide floor cover material which has been picked up via the pressing path when the flap is in the first position or through the device via the transit path. In this case, the flap 17a is moved into the second position if the determined dry matter content is higher than 20%, in particular higher than 25%. The material now follows the transit path and does not pass through the press, since it is dry enough. In order to be able to supply moisture to material which is too dry (dry matter content higher than 45, in particular higher than 50%) in this setting, the moisture outlet must be arranged at position 34a, or at buffer tank 40, and must be activated.

It is also possible to select to move flap 17a into the second position if the determined dry matter content is higher than 20%, in particular higher than 25% and is also lower than 50%, in particular lower than 45%. In this setting, floor cover material which is neither too wet nor too dry is guided via the buffer tank. Floor cover material which is too wet goes through the press and is pressed, and floor cover material which is too dry also goes through the press and is pressed after moisture has been supplied.

Different embodiments are described below. Sensor 18 may also be switched off, or the vehicle may also be configured without sensor 18, in which case moisture is constantly supplied to all of the material which has been picked up. Such an embodiment of the invention will always supply the material which has been picked up to the press, and press the wetted material. A suitable selection of the pressing pressure can lead to the desired dryness of the material. This advantageously brings the material to a very uniform dry matter content, without a sensor being required for measuring or determining the dry matter content. By means of simple field tests and calibrations, it is possible to select such a pressing pressure for the press which, at a known amount of supplied moisture (moisture flow rate), following pressing, supplies pressed floor cover material having a desired dry matter content.

In embodiments described with reference to FIG. 2, all of the floor cover material is picked up during operation, thus also the floor cover material which is not soiled. If the vehicle 1 is an autonomously movable vehicle 1, it is, however, desirable to make optimum use of the capacity of the batteries of the vehicle 1 by selectively picking up floor cover, namely only if the floor cover is soiled. A degree for soiling is, for example, a dry matter content which is too low, since it is too wet there. Soiled spots on the floor cover, i.e. the spots where animals have soiled the floor cover with, for example, manure, urine or other bodily substances such as, in the case of cows for example, milk, may be recognized in any suitable way, for example by using one or more cameras and/or a moisture sensor. A camera/infrared camera offers the possibility of recognizing movement, color, shape and heat, and of determining distance. A combination of these factors offers a good outcome for identifying the soiled spots. Using infrared, it is possible to detect heat, which offers an indication of the presence of feces and urine. It is then possible to use movement recognition to discern whether a warm spot is mobile. If this is the case, it is not feces or urine but rather an animal. Shape recognition may be used to distinguish a warm animal which is lying down from a warm soiled spot. Color recognition may contribute to distinguishing an animal from the manure fibers, while distance determination may be useful to ensure that the inspection is only carried out up to a certain height above the animal-shed floor. The camera may be attached to the vehicle 1. As an alternative, a plurality of cameras may be attached to the roof of the animal shed in order to thus be able to survey the entire surface area of the animal shed. In that case, there may, for example, be a wireless connection between the cameras and a control unit on the vehicle 1 to enable the transmission of current information from the cameras to the control unit. A temperature sensor may be used, if desired, to detect the heat of feces and on this basis to determine, when the occasion arises, that it does indeed relate to feces. Moisture sensors may be used to immediately detect where wet spots are, and are therefore highly suited for being used to detect soiled spots.

The moisture collector 30 illustrated in FIG. 2 serves as a collector for moisture which has been squeezed out and also as a moisture reservoir 31 from which moisture is supplied to the floor cover material. In another embodiment, it is possible to provide separate moisture collector and moisture reservoir. In this case, the moisture reservoir can be fed by the moisture collector. However, the two may also be entirely separate from one another and the moisture which has been squeezed out can be emptied at the charging station. At the charging station, it is also possible to load moisture which must be supplied to the floor cover material.

Locations for moisture outlet 34, 34*a* other than those shown in FIG. 2 are also conceivable, for instance the outlet may also be arranged lower. It is also conceivable for a moisture outlet to be arranged at the buffer tank 40. Instead of supplying moisture to material which has been picked up, it is also possible for one or more moisture outlets to be provided in order to supply moisture to floor cover material which is present on the animal-shed floor. Such a moisture outlet could, for example, be arranged on the front of the vehicle or on the rear. Other positions are also possible. One or more moisture outlets may also be provided to supply moisture to the floor cover material. A plurality of moisture outlets may be connected to one or more pumps are also conceivable.

In the embodiment shown, the operable additive outlet 37 is a metering pump which meters the additives in liquid state from the additive store to the moisture reservoir. Other additive storage and metering systems are also possible in order, for example, to also meter additives in dry form such as additives in powder or tablet form.

The roller press 20 may be designed in any suitable manner. It is not essential for the roller press 20 to comprise two sets of rollers 21, 22; it may also have more or fewer. Any suitable means for driving the sets of rollers 21, 22 may be provided on the vehicle 1. In general, one roller of the at least one set of rollers 21, 22 of the roller press 20 is porous, so that the moisture is pressed into this roller during the pressing action.

A press of a different kind, for example a screw press, is also among the options.

Instead of the wheels shown, the vehicle 1 may be provided with wheels and/or other driving means intended for this purpose in any suitable manner.

The dry matter content may also be determined indirectly, by measuring the environmental factors such as, for example, the atmosphere in the animal shed, weather conditions, atmospheric humidity, season, time of day, etc., sunshine, etc. For example, if there is wet weather in autumn (low temperature, high atmospheric humidity, no sunshine), it may be decided not to supply any moisture, and if it is dry and warm in the animal shed (low atmospheric humidity and high temperature), then it may be decided to supply moisture. Such an application of a dry matter content measurement may be developed with the aid of tests and measurements.

In order to realize a sufficiently constant movement of the vehicle, the vehicle may be provided with a floating suspension of the conveyor belt 10. To this end, for example, a frame may be provided at the conveyor belt assembly 10, which frame is movably connected to the frame 70 of the vehicle. If, in that case, the pick-up end 15 of the cover 10*b* becomes jammed during the forward movement of the vehicle because it encounters too much resistance from the floor cover material, the further movement of the vehicle can be intercepted in a kind of 'neutral' state, as the frame of the vehicle is able to move with respect to the frame of the jammed conveyor belt assembly 10. As a result, the circulating belt 11 has time to pick up and convey upward the floor cover material which has piled up in front of the pick-up end 15. When this material has been removed, the entirety of the vehicle and conveyor belt will once again begin moving in the forward direction. Moreover, this means that the material can be gathered properly by the pick-up means even in the case of an uneven floor.

If the layer of floor cover material is thin, such as perhaps in the case of a new animal shed, the pick-up foot 15 can run over the animal-shed floor instead of through the floor cover material. As the animals, in particular cows, add fibers to the floor through their manure, the thickness of the layer of floor cover material increases. If the layer thickness is higher than that which is picked up, a compact, compressed layer of floor cover material is created under the layer of floor cover material which is maintained by the vehicle.

The width of the strip of replaced material is narrower than the wheel tracks of the vehicle, which prevents the replaced material from being flattened by the vehicle.

It will be clear to a person skilled in the art that the scope of the invention is not limited to the examples discussed above, but that a number of variations and modifications thereof are possible without departing from the scope of the invention as defined in the attached claims.

The invention claimed is:

1. A device for maintenance of floor cover material present on an animal-shed floor in an animal shed, and comprising:
   pick-up means;
   a press;
   a moisture collector; and
   a moisture supply means;
   wherein the pick-up means is configured to pick up floor cover material from the animal-shed floor and supply the floor cover material to the press,
   wherein the press is configured to press the supplied floor cover material and to supply moisture which has been squeezed out to the moisture collector and to convey pressed floor cover material to the animal-shed floor,
   wherein the moisture supply means is configured to supply moisture to the floor cover material which has been picked up, and the moisture supply means comprises a moisture reservoir including a moisture outlet and an inlet, and wherein the moisture reservoir is fed by the moisture collector.

2. The device as claimed in claim 1, further comprising measuring means configured to determine a dry matter content of the floor cover material, wherein the moisture supply means is controlled as a function of the determined dry matter content.

3. The device as claimed in claim 2, wherein the moisture supply means is actuated to supply moisture if the determined dry matter content is higher than 45%.

4. The device as claimed in claim 1, wherein the moisture outlet is configured to supply moisture from the moisture reservoir to floor cover material which has been picked up by the device.

5. The device as claimed in claim 4, wherein the moisture outlet is configured to add moisture from the moisture reservoir to floor cover material which has been picked up by the pick-up means or to floor cover material which has been supplied to the press.

6. The device as claimed in claim 1, further comprising a storage space for additives having an additive outlet configured to supply the additives to the floor cover material which has been picked up.

7. The device as claimed in claim 6, wherein the additive outlet is configured to supply the additives to the moisture reservoir.

8. The device as claimed in claim 2, further comprising a guide movable between a first position, in which floor cover material which has been picked up is supplied to the press, and a second position, in which floor cover material which has been picked up is conveyed bypassing the press to the animal-shed floor, and wherein the guide is controllable as a function of the determined dry matter content.

9. The device as claimed in claim 8, wherein the guide is moved into the second position if the determined dry matter content is higher than 20%.

10. The device as claimed in claim 9, wherein the guide is moved into the second position if the determined dry matter content is lower than 50%.

11. The device as claimed in claim 1, further comprising a material collecting tank and a measuring means for measuring a parameter of the moisture which has been squeezed out, and wherein the moisture which has been squeezed out is guided from the press to the moisture collector or to the material collecting tank as a function of the measured parameter.

12. The device as claimed in claim 11, wherein the measuring means is configured to measure viscosity of the moisture which has been squeezed out and the parameter is a viscosity parameter.

13. The device as claimed in claim 1, further comprising a buffer tank, and wherein the device is configured to convey floor cover material which has been picked up to the animal-shed floor via the buffer tank.

14. The device as claimed in claim 1, further comprising an autonomous vehicle.

15. A device for maintenance of floor cover material present on an animal-shed floor in an animal shed, and comprising:
 a pick-up means;
 a press;
 a moisture collector;
 a material collection tank;
 a measuring means; and
 a moisture supply means,
 wherein the pick-up means is configured to pick up floor cover material from the animal-shed floor and supply the floor cover material to the press,
 wherein the press is configured to press the supplied floor cover material and to supply moisture which has been squeezed out to the moisture collector and to convey pressed floor cover material to the animal-shed floor,
 wherein the measuring means is configured to measure a parameter of moisture which has been squeezed out by the press,
 wherein the moisture which has been squeezed out is guided from the press to the moisture collecting tank or to the material collecting tank as a function of the measured parameter, and
 wherein the moisture supply means is configured to supply moisture to floor cover material which has been picked up by the pick-up means.

16. The device as claimed in claim 15, wherein the measuring means is configured to measure viscosity of the moisture which has been squeezed out and the parameter is a viscosity parameter.

17. The device as claimed in claim 15, further comprising a buffer tank, and wherein the device is configured to convey floor cover material which has been picked up to the animal-shed floor via the buffer tank.

18. The device as claimed in claim 15, further comprising an autonomous vehicle.

\* \* \* \* \*